United States Patent
Inukai

(10) Patent No.: US 8,873,991 B2
(45) Date of Patent: Oct. 28, 2014

(54) POWER SUPPLY SYSTEM, IMAGE FORMING APPARATUS HAVING THE SAME, AND LOW-CAPACITY AC PROCESSING CIRCUIT

(71) Applicant: Brother Kogyo Kabushiki Kaisha, Nagoya (JP)

(72) Inventor: Katsumi Inukai, Iwakura (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 97 days.

(21) Appl. No.: 13/626,675

(22) Filed: Sep. 25, 2012

(65) Prior Publication Data
US 2013/0129373 A1   May 23, 2013

(30) Foreign Application Priority Data

Nov. 17, 2011   (JP) .................................. 2011-251770

(51) Int. Cl.
*G03G 15/20*  (2006.01)
*H02M 1/32*  (2007.01)
*H02M 7/217*  (2006.01)
*H02H 9/04*  (2006.01)

(52) U.S. Cl.
CPC ............... *H02M 1/32* (2013.01); *H02M 7/217* (2013.01); *H02H 9/041* (2013.01)
USPC .................................. 399/88; 399/70; 399/69

(58) Field of Classification Search
USPC ................................................. 399/88, 69, 70
See application file for complete search history.

(56) References Cited

U.S. PATENT DOCUMENTS

| 5,914,538 A | 6/1999 | Kurosawa et al. |
| 6,088,243 A | 7/2000 | Shin |
| 6,178,102 B1 | 1/2001 | Stanley |

(Continued)

FOREIGN PATENT DOCUMENTS

| CN | 101009470 A | 8/2007 |
| EP | 0 942 518 A2 | 9/1999 |

(Continued)

OTHER PUBLICATIONS

European Search Report issued in EP 12 18 5920 mailed May 14, 2014.
Office Action issued in related Chinese application No. 201210365084.X, mailed Aug. 1, 2014.

*Primary Examiner* — Walter L Lindsay, Jr.
*Assistant Examiner* — Roy Y Yi
(74) *Attorney, Agent, or Firm* — Merchant & Gould PC

(57) ABSTRACT

A power supply system includes: a switching power supply to be connected to an AC power supply, the switching power supply rectifying and smoothing an AC voltage to generate predetermined DC voltage; a first capacitor including a first electrode connected to one end of the AC power supply, and a second electrode; a second capacitor including a first electrode connected to the other end of the AC power supply, and a second electrode; a surge-voltage suppressing circuit connected between the second electrode of the first capacitor and the second electrode of the second capacitor; a rectifier circuit connected to a first contact node between the first capacitor and the surge-voltage suppressing circuit and a second contact node between the second capacitor and the surge-voltage suppressing circuit; and an output-signal generating circuit connected to the rectifier circuit, and uses the rectified current to generate a predetermined output signal.

14 Claims, 8 Drawing Sheets

(56) References Cited

U.S. PATENT DOCUMENTS

| | | |
|---|---|---|
| 2001/0004073 A1* | 6/2001 | Little et al. .................... 219/501 |
| 2004/0190923 A1 | 9/2004 | Inukai |
| 2013/0028623 A1 | 1/2013 | Inukai |
| 2013/0031396 A1 | 1/2013 | Inukai |
| 2013/0038318 A1 | 2/2013 | Inukai |
| 2013/0111237 A1 | 5/2013 | Inukai |
| 2013/0113292 A1 | 5/2013 | Inukai |

FOREIGN PATENT DOCUMENTS

| | | |
|---|---|---|
| JP | H07-087734 A | 3/1995 |
| JP | H09-023638 A | 1/1997 |
| JP | 2004-151998 A | 5/2004 |
| JP | 2004-303469 A | 10/2004 |
| JP | 2010-239774 A | 10/2010 |

* cited by examiner

POWER SUPPLY SYSTEM, IMAGE FORMING APPARATUS HAVING THE SAME, AND LOW-CAPACITY AC PROCESSING CIRCUIT

CROSS-REFERENCE TO RELATED APPLICATION

This application is based upon and claims the benefit of priority of Japanese Patent Application No. 2011-251770 filed on Nov. 17, 2011, the contents of which are incorporated herein by reference in its entirety.

BACKGROUND

The present disclosure relates to a power supply system, an image forming apparatus having the power supply system, and a low-capacity AC processing circuit, and particularly, to a technology for suppressing a surge voltage which enters a power supply.

As an example of technologies for suppressing a surge voltage entering a power supply according to the related art, a constant voltage component is connected in parallel to a common-mode inductor, also called a common-mode choke coil, of a power input filter unit, thereby absorbing a counter-electromotive force which the power input filter unit generates in response to input of a surge voltage attributable to induced lightening or the like. This constant voltage component is provided to prevent damages of insulating components such as a transformer of a switching power supply and a photocoupler.

SUMMARY

Recently, a reduction in the power consumption of electronic apparatuses has been accelerated, and thus a reduction of power consumption has been required even for power supplies for electronic apparatuses. To this end, for example, it can be considered a technology in which a low-capacity power supply is provided in parallel with a switching power supply acting as a main power supply, and in a power saving mode of an electronic apparatus, the switching power supply is turned off, and when the switching power supply is in an OFF state, electric power is supplied from the low-capacity power supply only to a predetermined load. In this case, even with respect to the low-capacity power supply, a measure to a surge voltage is required. However, it cannot be said that a measure to a surge voltage is appropriately taken even for the low-capacity power supply by the technology of Japanese Patent Application Laid-Open No. 9-023638. Therefore, it is desired a measure to a surge voltage which is available even for a circuit accompanying with a main power supply and can be applied to a wide range.

One of aspects of the present disclosure was made on the basis of the above-mentioned circumferences, and an object is to provide a technology for implementing a measure to surge voltages applicable to a wider range.

The aspects of the present disclosure provide the following arrangements:

A power supply system comprising:
a switching power supply to be connected to an AC power supply, the switching power supply being configured to rectify and smooth an AC voltage to generate predetermined DC voltage;
a first capacitor including a first electrode connected to one end of the AC power supply, and a second electrode;
a second capacitor including a first electrode connected to the other end of the AC power supply, and a second electrode;
a surge-voltage suppressing circuit connected between the second electrode of the first capacitor and the second electrode of the second capacitor;
a rectifier circuit connected to a first contact node between the first capacitor and the surge-voltage suppressing circuit and a second contact node between the second capacitor and the surge-voltage suppressing circuit; and
an output-signal generating circuit connected to the rectifier circuit, and uses the rectified current to generate a predetermined output signal.

An image forming apparatus comprising:
a switching power supply to be connected to an AC power supply, the switching power supply being configured to rectify and smooth an AC voltage to generate predetermined DC voltage;
a first capacitor including a first electrode connected to one end of the AC power supply, and a second electrode;
a second capacitor including a first electrode connected to the other end of the AC power supply, and a second electrode;
a surge-voltage suppressing circuit connected between the second electrode of the first capacitor and the second electrode of the second capacitor;
a rectifier circuit connected to a first contact node between the first capacitor and the surge-voltage suppressing circuit and a second contact node between the second capacitor and the surge-voltage suppressing circuit;
an output-signal generating circuit connected to the rectifier circuit, and uses the rectified current to generate a predetermined output signal; and
a printing unit driven by the DC voltage generated by the switching power supply.

A low-capacity AC processing circuit comprising:
a first capacitor including a first electrode connected to one end of an AC power supply, and a second electrode;
a second capacitor including a first electrode connected to the other end of the AC power supply, and a second electrode;
a surge-voltage suppressing circuit that is connected between the second electrode of the first capacitor and the second electrode of the second capacitor;
a rectifier circuit that is connected to a first contact node of the first capacitor and the surge-voltage suppressing circuit and a second contact node of the second capacitor and the surge-voltage suppressing circuit; and
an output-signal generating circuit that is connected to the rectifier circuit, and uses the rectified current to generate a predetermined output signal.

According to the aspects of the present disclosure, it is possible to use the rectified current from the rectifier circuit to obtain the predetermined output signal, for example, a low DC voltage by the output-signal generating circuit. At this time, the rectifier circuit and the output-signal generating circuit are appropriately protected from surge voltages by the surge-voltage suppressing circuit connected between the second electrode of the first capacitor and the second electrode of the second capacitor. Therefore, it is possible to implement a measure to surge voltages applicable to a wide range.

DESCRIPTION OF EXEMPLARY EMBODIMENTS

An embodiment of the aspect of the present disclosure will be described with reference to FIGS. 1 and 2.

1. Description of Printer

Figure 1:
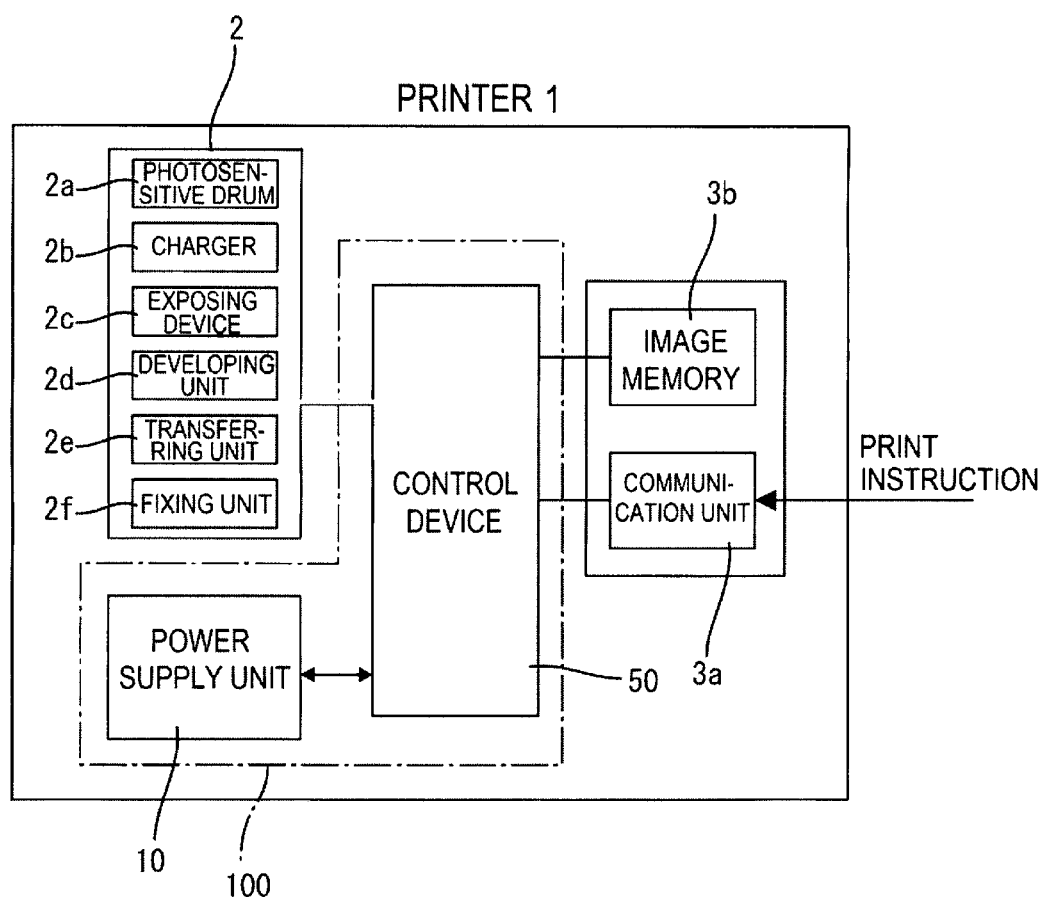
FIG. 1 is a block diagram illustrating a schematic configuration of an image forming apparatus according to an embodiment.

FIG. 1 is a block diagram illustrating the electrical configuration of a printer 1 which is an example of an image forming apparatus. The printer 1 includes a printing unit 2, a communication unit 3a, an image memory 3b, and a power supply system 100. The power supply system 100 includes a power supply unit 10 and a control device 50. The power supply unit 10 acts as a power supply of the printer 1, and supplies electric power to the printing unit 2, the communication unit 3a, the image memory 3b, and the control device 50.

The printing unit 2 includes a photosensitive drum 2a, a charger 2b for performing a charging process of charging the surface of the photosensitive drum 2a, an exposing device 2c for performing an exposing process of forming an electrostatic latent image on the surface of the photosensitive drum 2a, a developing unit 2d for performing a developing process of attaching a developer to the electrostatic latent image formed on the surface of the photosensitive drum 2a such that a developer image is formed, a transfer unit 2e for performing a transfer process of transferring the developer image onto a recording medium, and a fixing unit 2f for performing a fixing process of fixing the developer image transferred on the recording medium.

The printing unit 2 performs a printing process of performing the charging process, the exposing process, the developing process, the transfer process, and the fixing process so as to print an image based on print data on a recording medium. The communication unit 3a performs communication with an information terminal device such as a PC, and has a function of receiving print instructions and print data from the information terminal device. The image memory 3b temporarily stores print data received from the information terminal device.

If the communication unit 3a receives a print instruction from the information terminal device and receives print data, in the printer 1, the control device 50 controls the printing unit 2 such that the printing unit 2 performs the printing process of performing the charging process, the exposing process, the developing process, the transfer process, and the fixing process so as to print an image based on print data on a recording medium. The operating voltage of the printing unit 2 is generally 24V, whereas the operating voltages of the communication unit 3a, the image memory 3b, and the control device 50 are generally 3.3V.

The printer 1 has a normal mode and a power saving mode, as operation modes. The normal mode is a mode in which the printer 1 can perform the printing process immediately in response to a print instruction. Therefore, in the normal mode, the power supply system 100 operates, and thus supply of electric power to the fixing unit 2f is controlled such that the fixing unit 2f is maintained at a temperature at which fixing is possible or a temperature slightly lower than the temperature at which fixing is possible. The power saving mode means a mode which the printer 1 enters if any print instruction is not received for a predetermined period, and in which the printer 1 is in a standby state. In the saving mode, the power supply system 100 operates only partially, and thus electric power is not supplied to the fixing unit 2f.

2. Configuration of Power Supply System

Now, the configuration of the power supply system 100 will be described with reference to FIG. 2. The power supply unit 10 of the power supply system 100 includes an across-the-line capacitor (X capacitor) Cx, a common-mode choke coil L1, a switching power supply 20, and a low-capacity AC processing circuit 30.

The switching power supply 20 includes a rectifying/smoothing circuit 21, a control IC 22, a voltage generating circuit 23, a transformer 24, a field effect transistor (FET) Q1, a rectifying/smoothing circuit 25, a voltage detecting circuit 26, and DC to DC converters 27 and 28.

In the normal mode, the switching power supply 20 rectifies and smoothes an AC voltage Vac of an AC power supply AC so as to generate DC voltages of +24V, +5V, and +3.3V. The DC voltage of +24V (hereinafter, referred to as DC 24V) is output from a first output terminal OUT1, the DC voltage of +5V (hereinafter, referred to as DC 5V) is output from a second output terminal OUT2, and the DC voltage of +3.3V (hereinafter, referred to as DC 3.3V) is output from a third output terminal OUT3.

The rectifying/smoothing circuit 21 includes a photodiode for rectifying the AC voltage Vac (for example, 240V) of the AC power supply AC, and a capacitor for smoothing the rectified voltage. An output of the rectifying/smoothing circuit 21 is applied to a primary coil of the transformer 24.

The transistor Q1 is an N-channel MOSFET, and is turned on or off in response to an on/off signal (PWM signal) given to the gate of the transistor Q1 by the control IC 22. According to this switching operation of the transistor Q1, the primary side of the transformer 24 oscillates, and thus a voltage is induced on a secondary coil of the transformer 24.

Also, on the primary side of the transformer 24, the voltage generating circuit 23 is provided. The voltage generating circuit 23 rectifies and smoothes a voltage induced on an auxiliary coil provided on the primary side of the transformer 24, thereby generating a power supply voltage Vcc for the control IC 22.

The rectifying/smoothing circuit 25 rectifies and smoothes the voltage induced on the secondary coil of the transformer 24, thereby generating the DC 24V.

The voltage detecting circuit 26 includes a photocoupler PC1, and makes a light emitting diode LED1 of the photocoupler PC1 emit light in response to the detected level of the DC 24V output of the switching power supply 20. The photocoupler PC1 includes a phototransistor PT1 connected to a feedback port FB of the control IC 22. Therefore, a light signal of the light emitting diode LED1 is converted into an electric signal by the phototransistor PT1, and the detected value of the DC 24V output is fed back to the feedback port FB of the control IC 22.

The DC to DC converter 27 converts DC 24V into DC 5V and outputs DC 5V, and the DC to DC converter 28 converts DC 24V into DC 3.3V and outputs DC 3.3V.

The control IC 22 controls the on/off signal for the transistor Q1 in response to a control pulse signal Scp input to a control input port EN, such that oscillation of the primary side of the transformer 24 is controlled. In the normal mode, the control IC 22 oscillates the primary side of the transformer 24 such that the DC voltages are generated, and in the power saving mode, the control IC 22 stops output of the on/off signal to the transistor Q1 such that oscillation of the primary side of the transformer 24 stops. In other words, in the power saving mode, the DC voltages are not output from the switching power supply 20. When the printer 1 returns from the power saving mode to the normal mode, the control pulse signal Scp is input from the control unit 50 to the control input port EN, and thus oscillation of the primary side of the transformer 24 starts in response to the control pulse signal Scp such that the DC voltages are output from the switching power supply 20. In other words, in the normal mode of the printer 1, the switching power supply 20 becomes an output mode, and in the power saving mode of the printer 1, the switching power supply 20 becomes an output stop mode. Also, during start-up of the switching power supply 20, the power supply voltage is supplied to an input port VH.

The control device 50 includes an application-specific integrated circuit (ASIC) 51 and a switching-power-supply operation control unit 52. The ASIC 51 includes a main block B1 for controlling the printing unit 2 of the printer 1, and a mode control block B2 for mainly controlling the mode of the printer 1. A portion of the mode control may be performed by the main block B1. The main block B1 and the mode control block B2 may not be configured by the ASIC 51. For example, the main block B1 and the mode control block B2 may be configured by a main CPU and a sub CPU.

A power supply port P1 of the main block B1 receives DC 3.3V from the DC to DC converter 28 of the switching power supply 20. The main block B1 is subjected to supply of electric power to become an operation state, only in the normal mode. If the switching power supply 20 transitions to the output stop mode, that is, transition to the power saving mode is performed, the supply of electric power to the main block B1 is cut off such that the main block B1 becomes a stop state.

Also, the main block B1 includes a timer 55 and a memory 56, and detects the zero-crossing points of the AC voltage Vac of the AC power supply AC on the basis of a pulse signal Pzc input from a zero-crossing detecting circuit 42 to a port P5. Further, the main block B1 controls, for example, supply of electric power to the fixing unit 2f, on the basis of the zero-crossing points.

The timer 55 is used for time measurement during the detection of the zero-crossing points. The memory 56 includes a ROM and a RAM. The ROM stores various programs to be executed by the ASIC 51, and the RAM stores various kinds of data when the programs are executed.

Meanwhile, a power supply port P2 of the mode control block B2 is connected to a DC-to-DC converter 41 of a low-capacity power supply circuit 40, and is subjected to supply of electric power from the low-capacity power supply circuit 40 in the normal mode and the power saving mode. In response to mode switching of the printer 1, the mode control block B2 switches the switching power supply 20 between the output mode and the output stop mode in which oscillation of the switching power supply 20 is stopped.

In other words, the mode control block B2 outputs the control pulse signal Scp to the control IC 22, thereby switching the switching power supply 20 between the output mode and the output stop mode. Here, the output mode is a mode in which the primary side of the transformer 24 is made oscillate such that the switching power supply 20 becomes an output state, and corresponds to the normal mode. Meanwhile, the output stop mode is a mode in which the oscillation of the transformer 24 is stopped such that the output of the switching power supply 20 stops, and corresponds to the power saving mode. As described above, in the power saving mode, since the output of the switching power supply 20 is stopped, the control device 50, that is, the mode control block B2 of the ASIC 51 and a switching-power-supply operation control unit 52 are subjected to supply of electric power from the low-capacity power supply circuit 40.

The switching-power-supply operation control unit 52 includes a light emitting diode LED2 of a photocoupler PC2 and a transistor Q3. The anode of the light emitting diode LED2 is connected to a power supply line of direct current +3.3V (hereinafter, referred to as DC 3.3VB) from the DC-to-DC converter 41.

The light emitting diode LED2 constitutes the photocoupler PC2, together with a phototransistor PT2 connected to the control input port EN of the control IC 22 of the switching power supply 20. Therefore, if the control pulse signal Scp is output from a control port P3 of the mode control block B2 to the base of the transistor Q3, the control pulse signal Scp is optically transmitted through the photocoupler PC2, and is input to the control input port EN of the control IC 22.

As described above, in a case of switching from the power saving mode to the normal mode, due to electric power supplied from the low-capacity power supply circuit 40, the control unit 50, specifically, the mode control block B2 of the ASIC 51 generates the control pulse signal Scp for restarting oscillation of the switching power supply 20, and transmits the control pulse signal Scp to the switching power supply 20. Therefore, it is possible to use electric power accumulated during the power saving mode to appropriately perform switching from the power saving mode to the normal mode.

Also, the user can use a switch S1 to instruct the mode control block B2 to perform mode switching.

From a port P4 of the mode control block B2, a control signal Scon is output for turning on or off the operation of the DC to DC converter 28 of the switching power supply 20. For example, even in the normal mode, if electric power of DC 3.3VB supplied from the low-capacity power supply circuit 40 is sufficient, the AISC 51 uses the control signal Scon to stop the operation of the DC to DC converter 28 of the switching power supply 20.

3. Configuration of Low-Capacity AC Processing Circuit

Now, the low-capacity AC processing circuit 30 will be described. The low-capacity AC processing circuit 30 includes a first capacitor C1, a second capacitor C2, a surge-voltage suppressing circuit 31, a rectifier circuit 32, and a low-capacity power supply circuit 40.

The first capacitor C1 includes a first electrode C1p1 and a second electrode C1p2, the first electrode C1p1 is connected to one end of the AC power supply AC, and the second electrode C1p2 is connected to the surge-voltage suppressing circuit 31 and the rectifier circuit 32. Also, the second capacitor C2 includes a first electrode C2p1 and a second electrode C2p2, the first electrode C2p1 is connected to the other end of the AC power supply AC, and the second electrode C2p2 is connected to the surge-voltage suppressing circuit 31 and the rectifier circuit 32.

The surge-voltage suppressing circuit 31 is connected between the second electrode C1p2 of the first capacitor C1 and the second electrode C2p2 of the second capacitor C2. In the present embodiment, the surge-voltage suppressing circuit 31 includes a first surge-voltage suppressing circuit 31A and a second surge-voltage suppressing circuit 31B. As shown in FIG. 2, the first surge-voltage suppressing circuit 31A is composed of a parallel circuit of a capacitor C3 and a pair of bidirectional zener diodes ZD1 and ZD3, and the second surge-voltage suppressing circuit 31B is composed of a parallel circuit of a capacitor C4 and a pair of bidirectional zener diodes ZD2 and ZD4. The pair of bidirectional zener diodes ZD1 and ZD3 and the pair of bidirectional zener diodes ZD2 and ZD4 can be used to suppress positive and negative surge voltages to a zener voltage.

The first capacitor C1 and the second capacitor C2 insulate the low-capacity AC processing circuit 30 from the AC power supply AC in direct-current wise. Also, one end of the capacitor C3 and one end of the capacitor C4 are grounded, and the capacitor C3 and the capacitor C4 act as line-bypass capacitors (Y capacitors). Any one of the capacitor C3 and the capacitor C4 may be omitted.

The rectifier circuit 32 is connected between a first contact node Nd1 of the first capacitor C1 and the surge-voltage suppressing circuit 31 and a second contact node Nd2 of the second capacitor C2 and the surge-voltage suppressing circuit 31, and rectifies the AC voltage, thereby generating a rectified current Irc. In the present embodiment, the rectifier circuit 32 is configured by a bridge circuit composed of four diodes D1, D2, D3, and D4. The cathodes of the diode D1 and the diode D2 are connected at a third contact node Nd3, the anode of the diode D1 is connected to the second electrode C1$p2$ of the first capacitor C1, and the anode of the diode D2 is connected to the second electrode C2$p2$ of the second capacitor C2.

Further, the anodes of the diode D3 and the diode D4 are connected at a fourth contact node Nd4, the cathode of the diode D3 is connected to the second electrode C1$p2$ of the first capacitor C1, and the cathode of the diode D4 is connected to the second electrode C2$p2$ of the second capacitor C2.

Between the third contact node Nd3 and the low-capacity power supply circuit 40, a first surge-current suppressing resistor (an example of a first surge-current suppressing circuit) R1 is provided. Also, between the fourth contact node Nd4 and a reference potential line Lgd, a second surge-current suppressing resistor (an example of a second surge-current suppressing circuit) R2 is provided. Therefore, it is possible to suppress not only positive and negative surge voltages but also positive and negative surge currents.

Also, in the first embodiment, the power supply system 100 is connected to a frame ground. Therefore, the reference potential line Lgd is also grounded such that the potential of the reference potential line Lgd is 0V.

4. Configuration of Low-capacity Power Supply Circuit

Now, the low-capacity power supply circuit 40 will be described. The low-capacity power supply circuit 40 is an example of an output-signal generating circuit, is connected to the rectifier circuit 32, and uses the rectified current Irc of the rectifier circuit 32 to generate the DC 3.3VB and the pulse signal Pzc for zero-crossing detection (hereinafter, referred to simply as the pulse signal Pzc). The DC 3.3VB and the pulse signal Pzc correspond to predetermined output signals.

In the present embodiment, the low-capacity power supply circuit 40 includes a zener diode ZD1, a smoothing capacitor C3, a DC to DC converter 41, a circuit 42 for generating the pulse signal zero-crossing detection (hereinafter, referred to simply as the pulse generating circuit 42), and an accumulating capacitor C4. In the power saving mode and the normal mode, the low-capacity power supply circuit 40 uses the DC to DC converter 41 to supply low electric power to the control device 50. Specifically, in each mode, the low-capacity power supply circuit 40 supplies electric power to the mode control block B2 of the control unit 50 and a switching-power-supply operation control unit 52. Also, the low-capacity power supply circuit 40 includes the pulse generating circuit 42 for detecting the zero-crossing points of the AC power supply AC in the normal mode. In other words, in the present embodiment, the low-capacity power supply circuit 40 generates low electric power and generates the pulse signal Pzc for zero-crossing detection. The pulse generating circuit 42 may be omitted. In this case, the smoothing capacitor C3 and the zener diode ZD1 may also be omitted.

The smoothing capacitor C3 is connected to the rectifier circuit 31, and smoothes the rectified AC voltage, thereby generating a smooth voltage Vch. The smoothing capacitor C3 is electrically connected to the DC 5V output terminal (second output terminal) OUT2 of the switching power supply 20 through a diode D5.

The diode D5 is for preventing a backward flow from the smoothing capacitor C3 to the DC to DC converter (27) side. Also, the zener diode ZD1 is for suppressing the smooth voltage Vch from rising in a case where the AC voltage Vac of the AC power supply AC rises.

Any one of the smoothing capacitor C3 and the zener diode ZD1 may be omitted. Also, it is not essential to connect the smoothing capacitor C3 to the second output terminal (OUT2) of DC +5V of the switching power supply 20 through the diode D5, and this configuration may be omitted. In other words, the smoothing capacitor C3 may not be connected to the second output terminal OUT2 of the switching power supply 20.

The DC to DC converter 41 converts the smooth voltage Vch into the DC 3.3VB. The DC 3.3VB is supplied to the switching-power-supply operation control unit 52 and the power supply port P2 of the mode control block B2. In other words, electric power for the mode control block B2 is supplied from the low-capacity power supply circuit 40.

The accumulating capacitor C4 is charged by the DC 3.3VB from the DC to DC converter 41. The charged electric power is used as a driving current for the light emitting diode LED2 of the photocoupler PC2 during switching from the power saving mode to the normal mode. If the capacitances of the smoothing capacitor C3 and the accumulating capacitor C4 are appropriately selected, in the power saving mode, it is possible to accumulate an amount of electric power according to the needs for a predetermined voltage. It is possible to accumulate an amount of electric power for certainly driving the light emitting diode LED2 of the photocoupler PC2. Therefore, it is possible to reliably restart the switching power supply 20.

The pulse generating circuit 42 is connected to a current path IP, and generates the pulse signal Pzc corresponding to the zero-crossing points of the AC power supply AC, on the basis of the rectified current Irc flowing in the current path IP. On the basis of the pulse signal Pzc, the main block B1 of the ASIC 51 detects the zero-crossing points.

Figure 2:
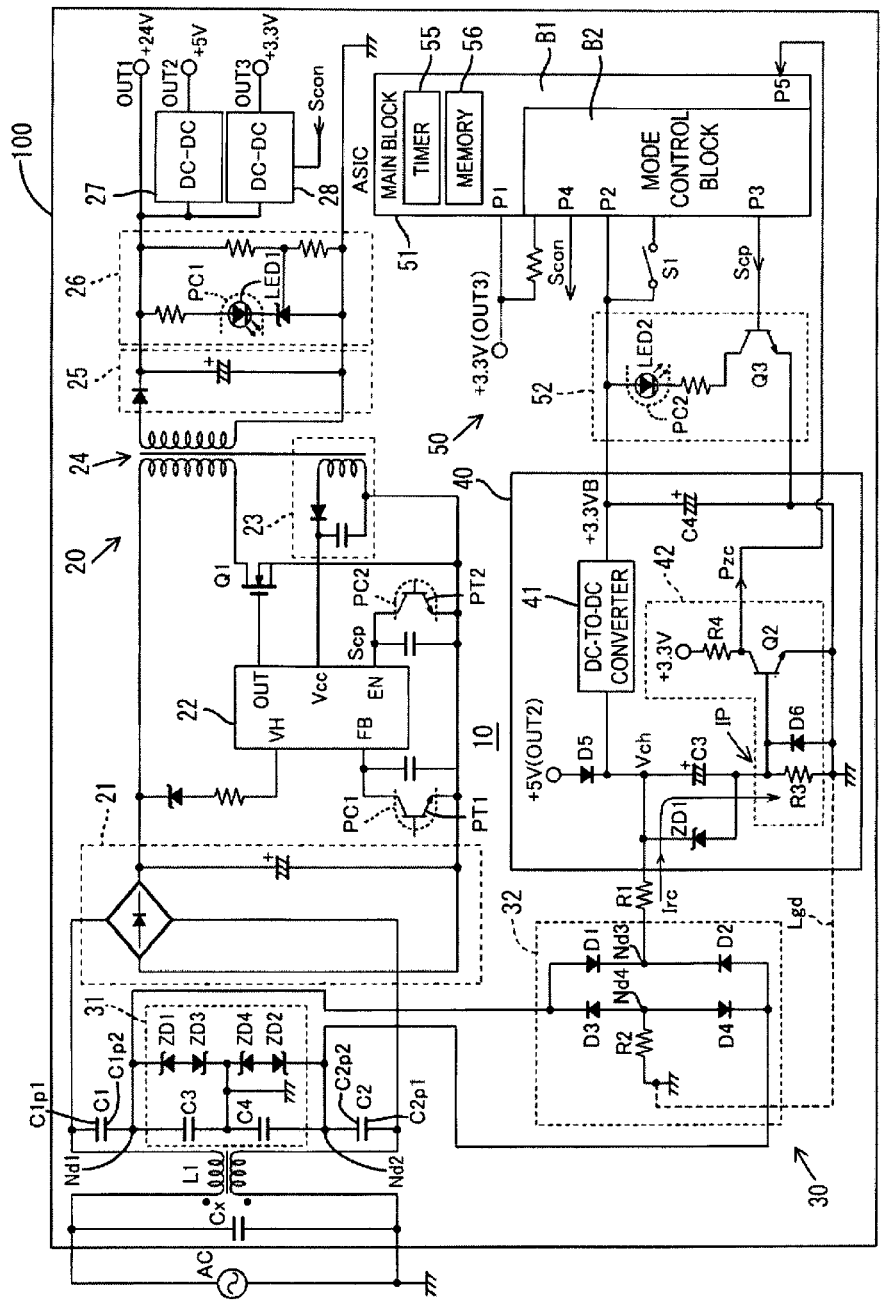
FIG. 2 is a circumferential direction illustrating a schematic configuration of a power supply system according to the embodiment.

As shown in FIG. 2, the pulse generating circuit 42 includes a resistor R3, a resistor R4, a diode D6, and an NPN transistor (hereinafter, referred to simply as a transistor) Q2.

The transistor Q2 acts as a switching transistor which is switched according to a base current generated by the rectified current Irc flowing in the current path IP. In other words, the transistor Q2 converts the rectified current Irc into the pulse signal Pzc.

Specifically, the collector of the transistor Q2 is connected to one end of the resistor R4, the base of the transistor Q2 is connected to the current path IP, and the emitter of the transistor Q2 is connected to the reference potential line Lgd. The resistor R4 is a pull-up resistor, and the other end of the resistor R4 is connected to the DC 3.3V output terminal OUT3 of the DC-to-DC converter 28.

The transistor Q2 is turn on or off in response to the base current supplied to the base. Also, the pulse signal Pzc is output from the collector of the transistor Q2, is 0V when the transistor Q2 is in an ON state, and is 3.3V when the transistor Q2 is in an OFF state. The ASIC 51 detects the pulse period Tp of the pulse signal Pzc, and uses the pulse period Tp to detect the zero-crossing points of the AC voltage Vac of the AC power supply AC.

The transistor Q2 is not limited to a NPN transistor. Also, the configuration for generating the pulse signal Pzc is not necessarily limited to the configuration of the transistor Q2 and the resistor R4. For example, the transistor Q2 may be an FET. In this case, it is preferable to provide a current-to-voltage converter circuit for converting the rectified current Irc into a gate voltage. As the current-to-voltage converter circuit, for example, a voltage follower operational amplifier can be used.

5. Effects of Present Embodiment

It is possible to use the rectified current Irc from the rectifier circuit 32 to obtain the predetermined output signals, that is, the low DC voltage 3.3VB and the pulse signal Pzc by the low-capacity power supply circuit 40. In this case, the rectifier circuit 32 and the low-capacity power supply circuit 40 are protected from surge voltages by the surge-voltage suppressing circuit 31. Therefore, it is possible to implement a measure to surge voltages applicable to a wide range.

Other Embodiments

The present invention is not limited to the embodiment described with reference to the drawings, but, for example, the following embodiments are included in the technical scope of the present invention.

Figure 3:
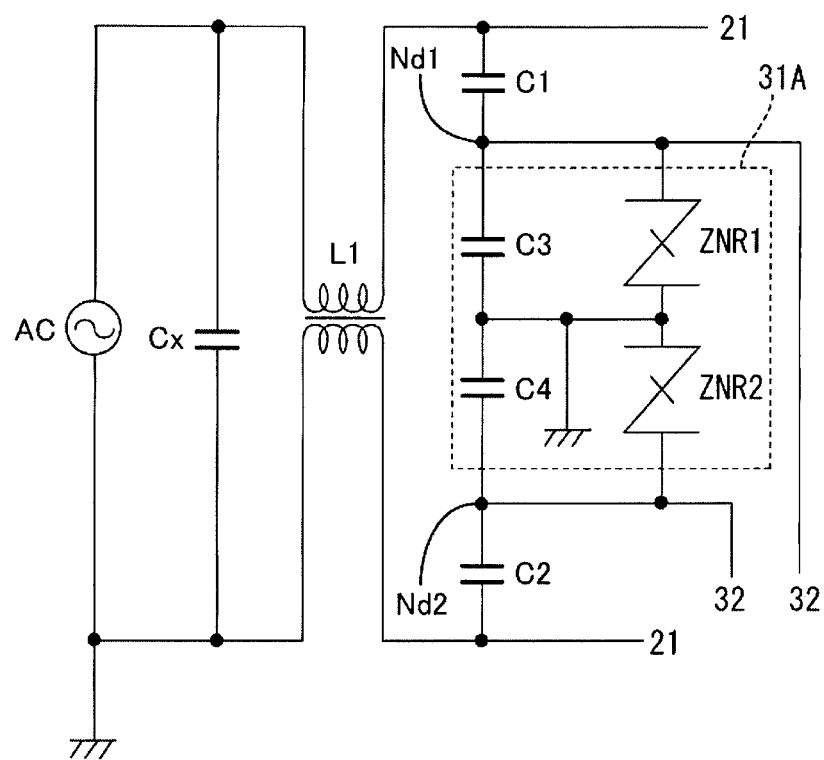
FIG. 3 is a circuit diagram illustrating another surge-voltage suppressing circuit.

(1) the configuration of the surge-voltage suppressing circuit 31 is not limited to that shown in FIG. 2. For example, as shown in a surge-voltage suppressing circuit 31A of FIG. 3, the pair of bidirectional zener diodes ZD1 and ZD3 and the pair of bidirectional zener diodes ZD2 and ZD4 may be replaced with a varistor ZNR1 and a varistor ZR2, respectively. Alternatively, arresters may be used. Here, the arrester means gap type arresters which discharge electric charge to semiconductor type arresters (zener diodes or a ZnO varistors).

Figure 4:
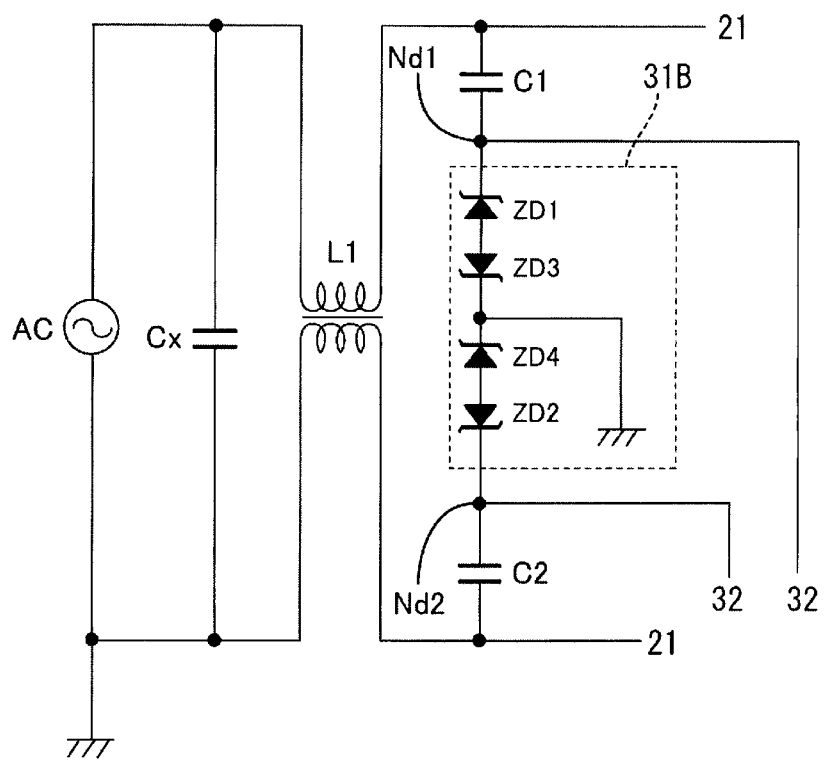
FIG. 4 is a circuit diagram illustrating another surge-voltage suppressing circuit.

Also, as shown in FIG. 4, only the pair of bidirectional zener diodes ZD1 and ZD3 and the pair of bidirectional zener diodes ZD2 and ZD4 may be configured without the capacitors C3 and C4.

Figure 5:
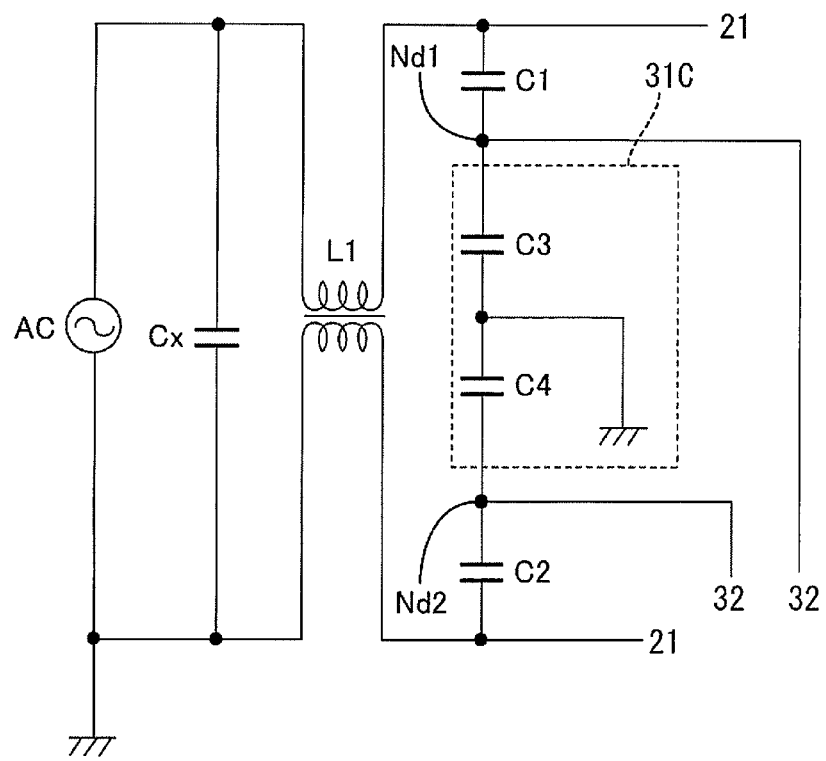
FIG. 5 is a circuit diagram illustrating another surge-voltage suppressing circuit.

Also, as shown in FIG. 5, only the capacitors C3 and C4 may be configured without the pair of bidirectional zener diodes ZD1 and ZD3 and the pair of bidirectional zener diodes ZD2 and ZD4. In this case, since the capacitors C3 and C4 correspond to so-called Y capacitors, it is also possible to suppress noise, and to suppress surge voltages by the voltage dividing effect of the capacitors.

Figure 6:
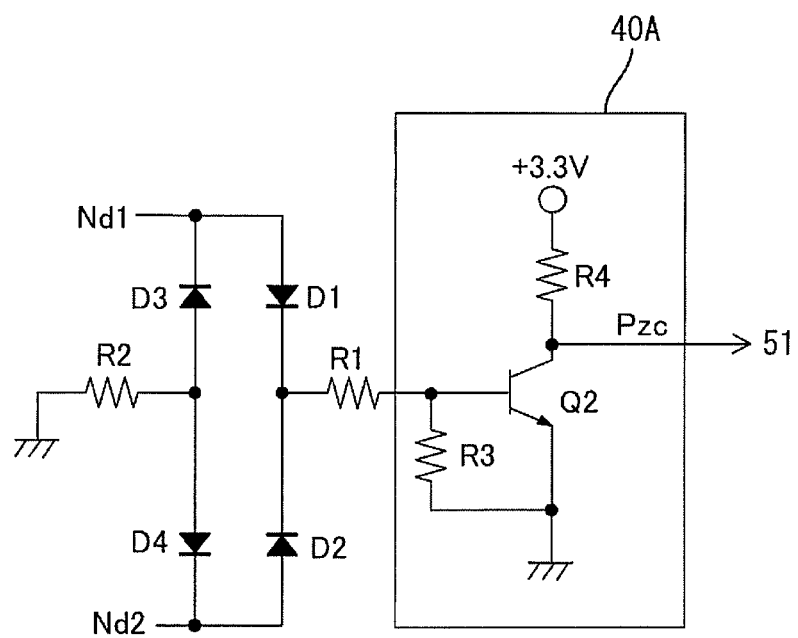
FIG. 6 is a circuit diagram illustrating another output-signal generating circuit.

(2) In the above-mentioned embodiment, as the configuration of the output-signal generating circuit for generating the predetermined output signals, the low-capacity power supply circuit 40 including the DC to DC converter 41 and the pulse generating circuit 42 is shown in FIG. 2. However, the output-signal generating circuit is not limited thereto. For example, as shown in FIG. 6, the output-signal generating circuit may be a zero-crossing detecting circuit 40A for generating the zero-crossing pulse signal Pzc corresponding to the zero-crossing points of the AC power supply AC. In this case, it is possible to suppress surge voltages or surge currents relating to the zero-crossing detecting circuit.

Figure 7:
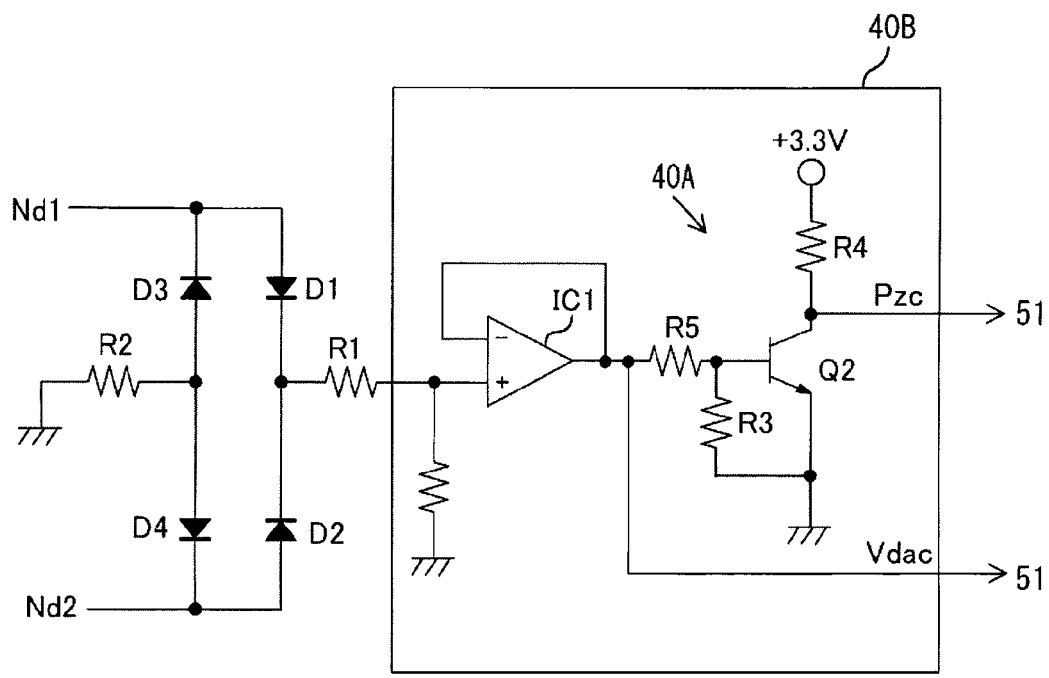
FIG. 7 is a circuit diagram illustrating another output-signal generating circuit.
Figure 8:
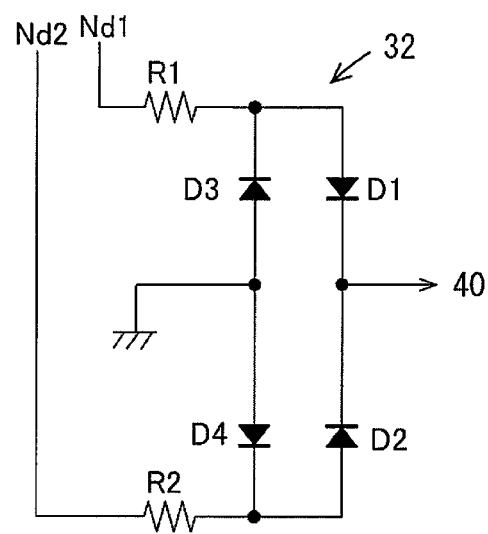
FIG. 8 is a circuit diagram illustrating another example of disposition of first and second surge-current suppressing resistors.

Also, as shown in FIG. 7, the output-signal generating circuit may be an AC-voltage detecting circuit 40B which includes a voltage follower operational amplifier (an example of a current-to-voltage converter circuit) for converting the rectified current Irc into a voltage, and outputs a voltage signal Vdac for detecting the maximum voltage of the AC power supply AC, as an output signal. In this case, it is possible to suppress surge voltages or surge currents relating to the AC voltage detecting circuit 40.

Further, as shown in FIG. 7, the AC voltage detecting circuit 40B may further include the zero-crossing detecting circuit 40A shown in FIG. 6. Also, in FIG. 2, instead of the pulse generating circuit 42, the AC voltage detecting circuit 40B of FIG. 20 may be included. In this case, it is also possible to detect the maximum voltage of the AC power supply AC.

(3) In the above-mentioned embodiment, the first surge-current suppressing resistor R1 and the second surge-current suppressing resistor R2 may be disposed at positions shown in FIG. 4. In other words, the first surge-current suppressing resistor R1 may be connected between the first contact node Nd1 and the rectifier circuit 32, and the second surge-current suppressing resistor R2 may be connected between the second contact node Nd2 and the rectifier circuit 32. Even in this configuration, it is possible to suppress surge currents.

(4) In the above-mentioned embodiment, the reference potential line Lgd is grounded. However, the present invention is not limited thereto. The present invention can be applied even to a case where the reference potential line Lgd is not grounded.

(5) In the above-mentioned embodiment, the power supply system 100 disclosed in this specification is applied to an image forming apparatus. However, the present invention is not limited thereto. The power supply system 100 can be applied to all apparatuses having a normal mode and a power saving mode.

What is claimed is:

1. A power supply system comprising:
   a switching power supply to be connected to an AC power supply, the switching power supply being configured to rectify and smooth an AC voltage to generate predetermined DC voltage;
   a first capacitor including a first electrode connected to one end of the AC power supply, and a second electrode connected to a first contact node;
   a second capacitor including a first electrode connected to the other end of the AC power supply, and a second electrode connected to a second contact node;
   a surge-voltage suppressing circuit configured to suppress a surge voltage, the surge-voltage suppressing circuit connected between the first contact node and the second contact node;
   a rectifier circuit connected between the first contact node and the second contact node; and
   an output-signal generating circuit connected to the rectifier circuit, and uses the rectified current to generate a predetermined output signal.

2. The power supply system according to claim 1, wherein the surge-voltage suppressing circuit is configured by any one of a zener diode, a varistor and an arrester.

3. The power supply system according to claim 1, wherein the surge-voltage suppressing circuit is configured by a parallel circuit of a capacitor and any one of a zener diode, a varistor and an arrester.

4. The power supply system according to claim 1, wherein the surge-voltage suppressing circuit is configured by a pair of bi-directional zener diodes.

5. The power supply system according to claim 1, wherein the surge-voltage suppressing circuit is configured by a parallel circuit of a capacitor and a pair of bi-directional zener diodes.

6. The power supply system according to claim 1, wherein the surge-voltage suppressing circuit is configured by a capacitor.

7. The power supply system according to claim 1, further comprising a first surge-current suppressing circuit that is connected between the rectifier circuit and the output-signal generating circuit.

8. The power supply system according to claim 1, further comprising a second surge-current suppressing circuit that is connected between the rectifier circuit and the reference potential line.

9. The power supply system according to claim 1, further comprising:
 a first surge-current suppressing circuit that is connected between the first contact node and the rectifier circuit; and
 a second surge-current suppressing circuit that is connected between the second contact node and the rectifier circuit.

10. The power supply system according to claim 1, wherein the output-signal generating circuit includes a low-capacity power supply circuit that includes a smoothing capacitor for smoothing the rectified current and outputs a predetermined DC voltage as the output signal.

11. The power supply system according to claim 1, wherein the output-signal generating circuit includes a zero-crossing detecting circuit that includes a switch circuit which is switched according to the rectified current and outputs a pulse signal for detecting the zero-crossing points of the AC power supply, as the output signal.

12. The power supply system according to claim 1, wherein the output-signal generating circuit includes an AC voltage detecting circuit that includes a current-to-voltage converter circuit for converting the rectified current into a voltage, and outputs the maximum voltage of the AC power supply as the output signal.

13. An image forming apparatus comprising:
 a switching power supply to be connected to an AC power supply, the switching power supply being configured to rectify and smooth an AC voltage to generate predetermined DC voltage;
 a first capacitor including a first electrode connected to one end of the AC power supply, and a second electrode connected to a first contact node;
 a second capacitor including a first electrode connected to the other end of the AC power supply, and a second electrode connected to a second contact node;
 a surge-voltage suppressing circuit configured to suppress a surge voltage, the surge-voltage suppressing circuit connected between the first contact node and the second contact node;
 a rectifier circuit connected between the first contact node and the second contact node;
 an output-signal generating circuit connected to the rectifier circuit, and uses the rectified current to generate a predetermined output signal; and
 an image forming unit driven by the DC voltage generated by the switching power supply.

14. A low-capacity AC processing circuit comprising:
 a first capacitor including a first electrode connected to one end of an AC power supply, and a second electrode connected to a first contact node;
 a second capacitor including a first electrode connected to the other end of the AC power supply, and a second electrode connected to a second contact node;
 a surge-voltage suppressing circuit configured to suppress a surge voltage, the surge-voltage suppressing circuit connected between the first contact node and the second contact node;
 a rectifier circuit that is connected between the first contact node and the second contact node; and
 an output-signal generating circuit that is connected to the rectifier circuit, and uses the rectified current to generate a predetermined output signal.

* * * * *